(12) United States Patent
Natsume (10) Patent No.: US 8,558,600 B2
(45) Date of Patent: Oct. 15, 2013

(54) CLOCK SIGNAL GENERATION CIRCUIT

(75) Inventor: Kenichi Natsume, Miyuzuki (JP)

(73) Assignee: Lapis Semiconductor Co., Ltd., Tokyo (JP)

( * ) Notice: Subject to any disclaimer, the term of this patent is extended or adjusted under 35 U.S.C. 154(b) by 15 days.

(21) Appl. No.: 13/431,275

(22) Filed: Mar. 27, 2012

(65) Prior Publication Data

US 2012/0249207 A1 Oct. 4, 2012

(30) Foreign Application Priority Data

Mar. 30, 2011 (JP) .................................. 2011-074838

(51) Int. Cl.
*G06F 1/06* (2006.01)
(52) U.S. Cl.
USPC .............. 327/293; 327/99; 327/198; 327/296
(58) Field of Classification Search
None
See application file for complete search history.

(56) References Cited

U.S. PATENT DOCUMENTS 6,194,969 B1 * 2/2001 Doblar .............................. 331/2
7,183,831 B2 * 2/2007 Ikeda ............................ 327/298

FOREIGN PATENT DOCUMENTS

JP 2001-344039 A 12/2001

* cited by examiner

*Primary Examiner* — An Luu
(74) *Attorney, Agent, or Firm* — Kubotera & Associates, LLC (57) ABSTRACT

A clock signal generation circuit includes a first oscillation circuit for generating a first oscillation clock signal having a first frequency; a second oscillation circuit for generating a second oscillation clock signal having a second frequency; a frequency division circuit for generating a frequency division clock signal obtained through dividing the first oscillation clock signal; and a clock selection circuit for outputting the first oscillation clock signal as a high speed clock signal. The clock selection circuit is configured to output the second oscillation clock signal as the low speed clock signal when the second oscillation circuit transmits the second oscillation clock signal, and to output the frequency division clock signal as the low speed clock signal when the second oscillation circuit does not transmit the second oscillation clock signal.

6 Claims, 4 Drawing Sheets

CLOCK SIGNAL GENERATION CIRCUIT

BACKGROUND OF THE INVENTION AND RELATED ART STATEMENT

The present invention relates to a clock signal generation circuit. In particular, the present invention relates to a clock signal generation circuit capable of generating a plurality of clock signals having frequencies different to each other.

In general, a signal processing circuit disposed in a semiconductor integrated device (referred to as an LSI) is operated at a clock signal with a high frequency when the signal processing circuit needs to perform a high speed processing. On the other hand, when the signal processing circuit does not need to perform a high speed processing, the signal processing circuit is operated at a clock signal with a low frequency. Accordingly, it is possible to perform the high speed processing or reduce power consumption.

Further, an oscillation circuit is disposed in the LSI for generating the clock signal described above. The oscillation circuit may include a crystal ceramic oscillation circuit, a PLL (Phase Locked Loop) oscillation circuit, and a CR (Capacitor Resistor) oscillation circuit formed of a capacitor and a resistor. The CR oscillation circuit is characterized to have a shorter waiting period, from when the CR oscillation circuit is turned on to when the oscillation frequency of the CR oscillation circuit is stabilized, as compared to the crystal ceramic oscillation circuit or the PLL oscillation circuit.

Although the PLL oscillation circuit has a longer waiting period as compared with the CR oscillation circuit, the PLL oscillation circuit is characterized to be capable of generating a clock signal with a higher frequency. In the crystal ceramic oscillation circuit, the characteristics of a crystal determines the oscillation frequency thereof. Accordingly, it is difficult to change the oscillation frequency. However, the crystal ceramic oscillation circuit is characterized to be capable of generating a clock signal with a higher frequency.

Patent Reference has disclosed a conventional clock signal generation circuit. In the conventional clock signal generation circuit, the CR oscillation circuit, the PLL oscillation circuit, and the crystal ceramic oscillation circuit described above are combined, so that the characteristics thereof are effectively utilized. Accordingly, it is possible to reduce the waiting period and power consumption.

Patent Reference Japanese Patent Publication No. 2001-344039

In the conventional clock signal generation circuit disclosed in Patent Reference, the crystal oscillation circuit is provided for generating a clock signal CLK1 with a low frequency, so that the clock signal CLK1 is supplied to the signal processing circuit described above. The CR oscillation circuit is provided for generating a first clock signal CLK11 with a high frequency. Further, the PLL oscillation circuit is provided for generating a second clock signal CLK12 with a high frequency according to the clock signal CLK1 with the low frequency generated with the crystal oscillation circuit.

When the conventional clock signal generation circuit disclosed in Patent Reference starts operating, it is configured such that the first clock signal CLK11 generated by the CR oscillation circuit with the relatively short waiting period is supplied to the signal processing circuit. After the oscillation state of the PLL oscillation circuit is stabilized, instead of the first clock signal CLK11, the second clock signal CLK12 generated by the PLL oscillation circuit is supplied to the signal processing circuit.

In the conventional clock signal generation circuit disclosed in Patent Reference, the crystal oscillation circuit has the long waiting period of the long oscillation stabilization period of about a few hundreds ms, from when the crystal oscillation circuit is turned on to when the oscillation operation of the crystal oscillation circuit is stabilized. Accordingly, it is necessary to provide a long startup time to a circuit block that is operated with the clock signal CLK1 with the low frequency.

In the conventional clock signal generation circuit disclosed in Patent Reference, the crystal oscillation circuit includes a crystal oscillation element externally connected to the LSI for operating the crystal oscillation circuit. It has been known that the crystal oscillation element tends to be susceptible to an external noise such as an electromagnetic wave, vibration, and the like, or an external disturbance effect such as moisture, dust, a foreign matter, and the like. When the crystal oscillation element stops operating due to the external noise or the external disturbance, the PLL oscillation circuit stops generating the second clock signal CLK12. As a result, when the clock signal to be supplied to the signal processing circuit is switched from the first clock signal SLK11 to the second clock signal SLK12, the signal processing circuit stops operating.

In view of the problems described above, an object of the present invention is to provide a clock signal generation circuit capable of solving the problems of the conventional clock signal generation circuit. In the present invention, it is possible to quickly startup after the clock signal generation circuit is turned on, and to continuously generate a clock signal even when the external noise or the external disturbance occurs.

Further objects and advantages of the invention will be apparent from the following description of the invention.

SUMMARY OF THE INVENTION

In order to attain the objects described above, according to an aspect of the present invention, a clock signal generation circuit is configured to generate a high speed clock signal having a first frequency and a low speed clock signal having a second frequency lower than the first frequency.

According to the aspect of the present invention, the clock signal generation circuit includes a first oscillation circuit for generating a first oscillation clock signal having the first frequency; a second oscillation circuit for generating a second oscillation clock signal having the second frequency; a frequency division circuit for generating a frequency division clock signal obtained through dividing the first oscillation clock signal; and a clock selection circuit for outputting the first oscillation clock signal as the high speed clock signal.

According to the aspect of the present invention, the clock selection circuit is configured to output the second oscillation clock signal as the low speed clock signal when the second oscillation circuit transmits the second oscillation clock signal. Further, the clock selection circuit is configured to output the frequency division clock signal as the low speed clock signal when the second oscillation circuit does not transmit the second oscillation clock signal.

As described above, in the aspect of the present invention, the clock selection circuit is configured to output the first oscillation clock signal as the high speed clock signal, and to output the second oscillation clock signal as the low speed clock signal when the second oscillation circuit transmits the second oscillation clock signal. Further, the clock selection circuit is configured to output the frequency division clock signal as the low speed clock signal when the second oscillation circuit does not transmit the second oscillation clock signal.

In the aspect of the present invention, the first oscillation circuit may be formed of the CR oscillation circuit, and the second oscillation circuit may be formed of the crystal oscillation circuit or the ceramic oscillation circuit. Accordingly, an oscillation state of the first oscillation circuit is stabilized in a shorter period of time as compared with the second oscillation circuit.

In this case, immediately after the clock selection circuit is turned on, the clock selection circuit is configured to output the frequency division clock signal, which is obtained through dividing the first oscillation clock signal generated with the first oscillation circuit, as the low speed clock signal.

Accordingly, after the clock selection circuit is turned on, before the oscillation state of the second oscillation circuit formed of the crystal oscillation circuit of the ceramic oscillation circuit is stabilized, it is possible to supply the low speed clock signal. As a result, it is possible to quickly startup a signal processing circuit operated with the low speed clock signal. After the oscillation state of the second oscillation circuit formed of the crystal oscillation circuit or the ceramic oscillation circuit is stabilized, instead of the frequency division clock signal, the second oscillation clock signal accurately generated with the second oscillation circuit is supplied as the low speed clock signal to the signal processing circuit.

After the oscillation state of the second oscillation circuit is stabilized, even when the crystal oscillation circuit or the ceramic oscillation circuit becomes malfunction due to the external disturbance effect, instead of the second oscillation clock signal, the frequency division clock signal is supplied as the low speed clock signal to the signal processing circuit. Accordingly, it is possible to continuously operate the signal processing circuit with the low speed clock signal.

DETAILED DESCRIPTION OF PREFERRED EMBODIMENTS

Hereunder, preferred embodiments of the present invention will be explained with reference to the accompanying drawings.

In the present invention, a clock signal generation circuit is configured to generate a high speed clock signal having a first frequency and a low speed clock signal having a second frequency lower than the first frequency.

According to the present invention, a clock selection circuit is configured to output a first oscillation clock signal generated with a first oscillation circuit as the high speed clock signal. The clock selection circuit is configured to output a second oscillation clock signal generated with a second oscillation circuit as the low speed clock signal when the second oscillation circuit transmits the second oscillation clock signal. Further, the clock selection circuit is configured to output a frequency division clock signal obtained through dividing the first oscillation clock signal as the low speed clock signal when the second oscillation circuit does not transmit the second oscillation clock signal.

First Embodiment

Figure 1:
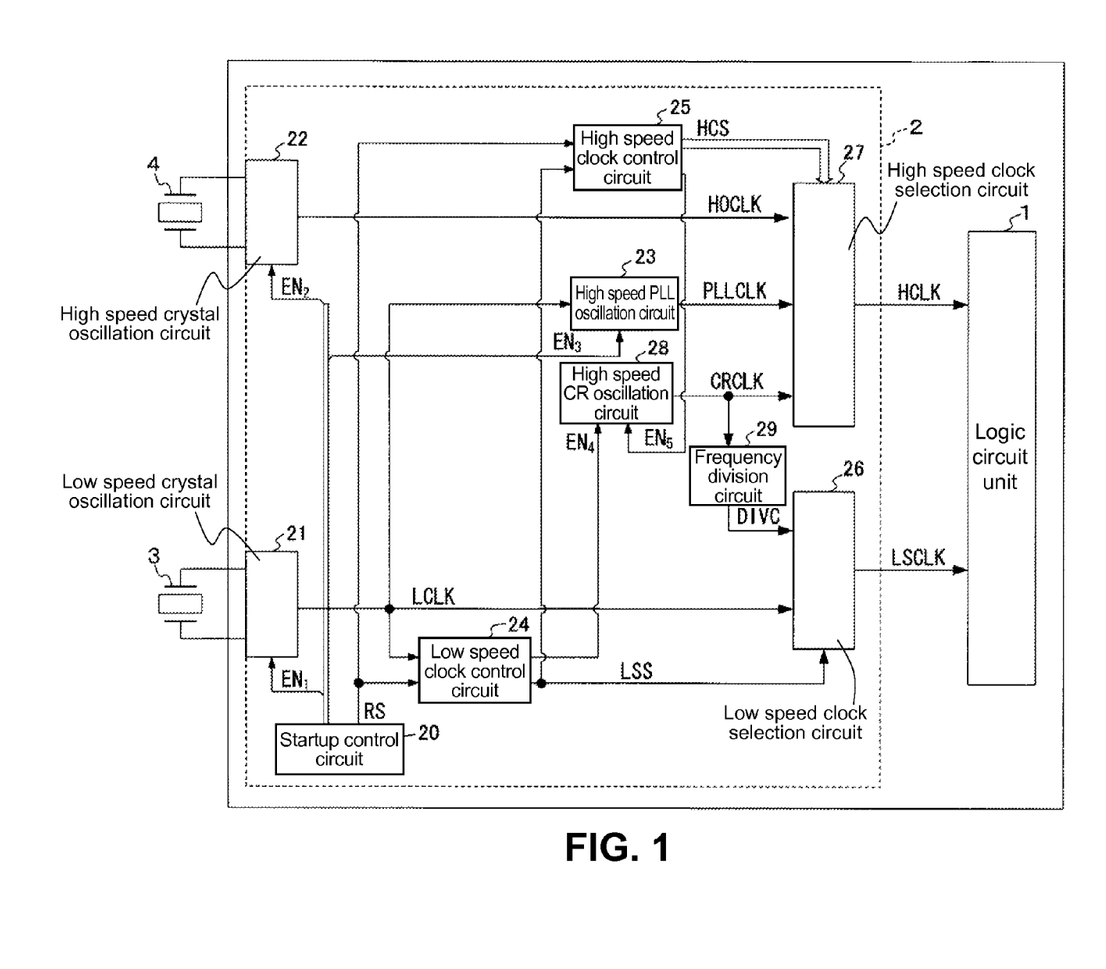
FIG. 1 is a block diagram showing an internal configuration of an LSI with a clock signal generation circuit disposed therein according to a first embodiment of the present invention.

A first embodiment of the present invention will be explained. FIG. 1 is a block diagram showing an internal configuration of an LSI with a clock signal generation circuit disposed therein according to a first embodiment of the present invention.

As shown in FIG. 1, the LSI includes a logic circuit unit 1 for performing various signal processing as a primary operation of the LSI, and a clock signal generation unit 2. The clock signal generation unit 2 is configured to generate a high speed clock signal HCLK for operating the logic circuit unit 1 and a low speed clock signal LSCLK having a frequency lower than that of the high speed clock signal HCLK. Further, the clock signal generation unit 2 is configured to supply the high speed clock signal HCLK and the low speed clock signal LSCLK to the logic circuit unit 1.

Further, the LSI includes a first crystal oscillator 3 and a second crystal oscillator 4. The first crystal oscillator 3 is configured to generate an oscillation signal having a low frequency as an oscillation source of the low speed clock signal LSCLK. The second crystal oscillator 4 is configured to generate an oscillation signal having a frequency higher than that of the low speed clock signal LSCLK.

In the embodiment, the clock signal generation unit 2 includes a startup control circuit 20; a low speed crystal oscillation circuit 21; a high speed crystal oscillation circuit 22; and a high speed PLL (Phase Locked Loop) oscillation circuit 23. When the low speed crystal oscillation circuit 21, the high speed crystal oscillation circuit 22, and the high speed PLL oscillation circuit 23 perform the oscillation operation, the startup control circuit 20 is configured to supply oscillation enable signals EN1, EN2, and EN3 with a logic level "1" to the low speed crystal oscillation circuit 21, the high speed crystal oscillation circuit 22, and the high speed PLL oscillation circuit 23, respectively. When the low speed crystal oscillation circuit 21, the high speed crystal oscillation circuit 22, and the high speed PLL oscillation circuit 23 stop the oscillation operation, the startup control circuit 20 is configured to supply the oscillation enable signals EN1, EN2, and EN3 with a logic level "0" to the low speed crystal oscillation circuit 21, the high speed crystal oscillation circuit 22, and the high speed PLL oscillation circuit 23, respectively.

In the embodiment, the clock signal generation unit 2 further includes a low speed clock control circuit 24 and a high speed clock control circuit 25. When the power is turned on, the startup control circuit 20 is configured to generate a reset pulse signal RS, so that the startup control circuit 20 supplies the reset pulse signal RS to the low speed clock control circuit 24 and the high speed clock control circuit 25, respectively.

In the embodiment, the low speed crystal oscillation circuit 21 is configured to generate an oscillation clock signal LCLK having a low frequency according to an oscillation signal supplied from the first crystal oscillator 3 when the startup control circuit 20 supplies the oscillation enable signal EN1 with the logic level "1" to the low speed crystal oscillation circuit 21. Further, the low speed crystal oscillation circuit 21 is configured to supply the oscillation clock signal LCLK to the high speed PLL oscillation circuit 23, the low speed clock control circuit 24, and the high speed clock control circuit 25, respectively. It is noted that the low speed crystal oscillation circuit 21 is configured to stop the oscillation operation thereof so as to stop generating the oscillation clock signal LCLK when the startup control circuit 20 supplies the oscillation enable signal EN1 with the logic level "0" to the low speed crystal oscillation circuit 21.

In the embodiment, when the oscillation enable signal EN1 is switched from the logic level "0" to the logic level "1" to initiate a startup instruction, the low speed crystal oscillation circuit 21 starts the oscillation operation according to the startup instruction. After the startup instruction is initiated, the low speed crystal oscillation circuit 21 becomes a state capable of stably generating the oscillation clock signal LCLK after an oscillation stabilization period TA (described later).

In the embodiment, the high speed crystal oscillation circuit 22 is configured to generate an oscillation clock signal HOCLK having a high frequency according to an oscillation signal supplied from the second crystal oscillator 4 when the startup control circuit 20 supplies the oscillation enable signal EN2 with the logic level "1" to the high speed crystal oscillation circuit 22.

Further, in the embodiment, the clock signal generation unit 2 includes a high speed clock selection circuit 27. The high speed crystal oscillation circuit 22 is configured to supply the oscillation clock signal HOCLK to the high speed clock selection circuit 27. It is noted that the high speed crystal oscillation circuit 22 is configured to stop the oscillation operation thereof so as to stop generating the oscillation clock signal HOCLK when the startup control circuit 20 supplies the oscillation enable signal EN2 with the logic level "0" to the high speed crystal oscillation circuit 22.

In the embodiment, with the oscillation clock signal LCLK as the reference clock, the high speed PLL oscillation circuit 23 is configured to generate an oscillation clock signal PLLCLK having a frequency higher than that of the oscillation clock signal LCLK and a phase synchronized with that of the oscillation clock signal LCLK when the startup control circuit 20 supplies the oscillation enable signal EN3 with the logic level "1" to the high speed PLL oscillation circuit 23. Further, the high speed PLL oscillation circuit 23 is configured to supply the oscillation clock signal PLLCLK to the high speed clock selection circuit 27. It is noted that the high speed PLL oscillation circuit 23 is configured to stop the oscillation operation thereof so as to stop generating the oscillation clock signal PLLCLK when the startup control circuit 20 supplies the oscillation enable signal EN3 with the logic level "0" to the high speed PLL oscillation circuit 23.

In the embodiment, when the oscillation enable signal EN3 is switched from the logic level "0" to the logic level "1" to initiate the startup instruction, the high speed PLL oscillation circuit 23 starts the oscillation operation according to the startup instruction. After the startup instruction is initiated, the high speed PLL oscillation circuit 23 becomes a state capable of stably generating the oscillation clock signal PLLCLK after an oscillation stabilization period TC (described later).

In the embodiment, the clock signal generation unit 2 further includes a low speed clock selection circuit 26. The low speed clock control circuit 24 is configured to supply a low speed clock selection control signal LSS with the logic level "1" to the low speed clock selection circuit 26 according to the reset pulse signal RS, so that the low speed clock selection circuit 26 selects a frequency division clock signal DIVC (described later).

In the next step, the low speed clock control circuit 24 determines whether the low speed crystal oscillation circuit 21 supplies the oscillation clock signal LCLK. When the low speed clock control circuit 24 determines that the low speed crystal oscillation circuit 21 supplies the oscillation clock signal LCLK, the low speed clock control circuit 24 supplies the low speed clock selection control signal LSS with the logic level "0" to the low speed clock selection circuit 26, so that the low speed clock selection circuit 26 selects the oscillation clock signal LCLK. When the low speed clock control circuit 24 determines that the low speed crystal oscillation circuit 21 does not supply the oscillation clock signal LCLK, the low speed clock control circuit 24 switches the logic level "0" of the low speed clock selection control signal LSS to the logic level "1", so that the low speed clock selection circuit 26 selects the frequency division clock signal DIVC.

In the embodiment, the clock signal generation unit 2 further includes a high speed CR (Capacitor Resistor) oscillation circuit 28. The low speed clock control circuit 24 is also configured to supply the low speed clock selection control signal LSS to the high speed clock control circuit 25. When the low speed crystal oscillation circuit 21 does not supply the oscillation clock signal LCLK, the low speed clock control circuit 24 is configured to supply an oscillation enable signal EN4 with the logic level "1" to the high speed CR oscillation circuit 28, so that the high speed CR oscillation circuit 28 performs the oscillation operation.

In the embodiment, the high speed CR oscillation circuit 28 is configured to perform the oscillation operation using a resistor and a capacitor only when the low speed clock control circuit 24 supplies the oscillation enable signal EN4 with the logic level "1" to the high speed CR oscillation circuit 28, or the high speed clock control circuit 25 supplies an oscillation enable signal EN5 with the logic level "1" to the high speed CR oscillation circuit 28. Further, the high speed PLL oscillation circuit 23 is configured to supply the oscillation clock signal PLLCLK to the high speed clock selection circuit 27.

In the embodiment, the clock signal generation unit 2 further includes a frequency division circuit 29. When the high speed CR oscillation circuit 28 performs the oscillation operation, the high speed CR oscillation circuit 28 generates an oscillation clock signal CRCLK having a frequency higher than that of the oscillation clock signal LCLK, so that the high speed CR oscillation circuit 28 supplies the oscillation clock signal CRCLK to the high speed clock selection circuit 27 and the frequency division circuit 29, respectively.

In the embodiment, when the oscillation enable signal EN4 is switched from the logic level "0" to the logic level "1" to initiate the startup instruction, the high speed CR oscillation circuit 28 starts the oscillation operation according to the startup instruction. After the startup instruction is initiated, the high speed CR oscillation circuit 28 becomes a state capable of stably generating the oscillation clock signal CRCLK after an oscillation stabilization period TB (described later).

In the embodiment, the high speed clock control circuit 25 is configured to supply a high speed clock selection control signal HCS to the high speed clock selection circuit 27 according to the reset pulse signal RS, so that the high speed clock selection circuit 27 selects the oscillation clock signal CRCLK supplied from the high speed CR oscillation circuit 28. Further, the high speed clock control circuit 25 is configured to generate and supply the high speed clock selection control signal HCS to the high speed clock selection circuit 27 according to a clock selection control process, so that the high speed clock selection circuit 27 selects one of the oscillation clock signal HOCLK, the oscillation clock signal PLLCLK, and the oscillation clock signal CRCLK.

During the period of time, when the low speed clock control circuit 24 supplies the low speed clock selection control signal LSS with the logic level "1" to the high speed clock control circuit 25 to select the frequency division clock signal DIVC, that is, the low speed crystal oscillation circuit 21 does not supply the oscillation clock signal LCLK, the high speed clock control circuit 25 supplies the high speed clock selection control signal HCS to S27, so that the high speed clock selection circuit 27 selects the oscillation clock signal CRCLK.

Further, according to the clock selection control process, the high speed clock control circuit 25 supplies the oscillation enable signal EN5 with the logic level "1" to the high speed CR oscillation circuit 28, so that the high speed CR oscillation circuit 28 performs the oscillation operation. On the other hand, the high speed clock control circuit 25 supplies the oscillation enable signal EN5 with the logic level "0" to the high speed CR oscillation circuit 28, so that the high speed CR oscillation circuit 28 stops the oscillation operation.

In the embodiment, the high speed clock selection circuit 27 is configured to select one of the oscillation clock signal HOCLK, the oscillation clock signal PLLCLK, and the oscillation clock signal CRCLK as indicated with the high speed clock selection control signal HCS. Then, the high speed clock selection circuit 27 is configured to supply the selected one to the logic circuit unit 1 as the high speed clock signal HCLK.

In the embodiment, the frequency division circuit 29 is configured to divide the oscillation clock signal CRCLK supplied from the high speed CR oscillation circuit 28 by N (N is a natural integer) to generate the frequency division clock signal DIVC, so that the frequency division circuit 29 supplies the frequency division clock signal DIVC to the low speed clock selection circuit 26.

More specifically, the frequency division circuit 29 is configured to divide the oscillation clock signal CRCLK such that the frequency of the frequency division clock signal DIVC matches to the frequency of the oscillation clock signal LCLK or becomes closer to a closest frequency of the oscillation clock signal LCLK. For example, when the oscillation clock signal CRCLK has the frequency of 500 kHz, and the oscillation clock signal LCLK has the frequency of 32.768 kHz, the frequency division circuit 29 sets N to sixteen. Accordingly, the frequency of the frequency division clock signal DIVC becomes 31.25 kHz (500/16=31.25).

In the embodiment, the low speed clock selection circuit 26 is configured to select one of the frequency division clock signal DIVC and the oscillation clock signal LCLK supplied from the low speed crystal oscillation circuit 21 according to the low speed clock selection control signal LSS. Then, the low speed clock selection circuit 26 supplies the selected one to the logic circuit unit 1 as the low speed clock signal LSCLK.

Figure 2:
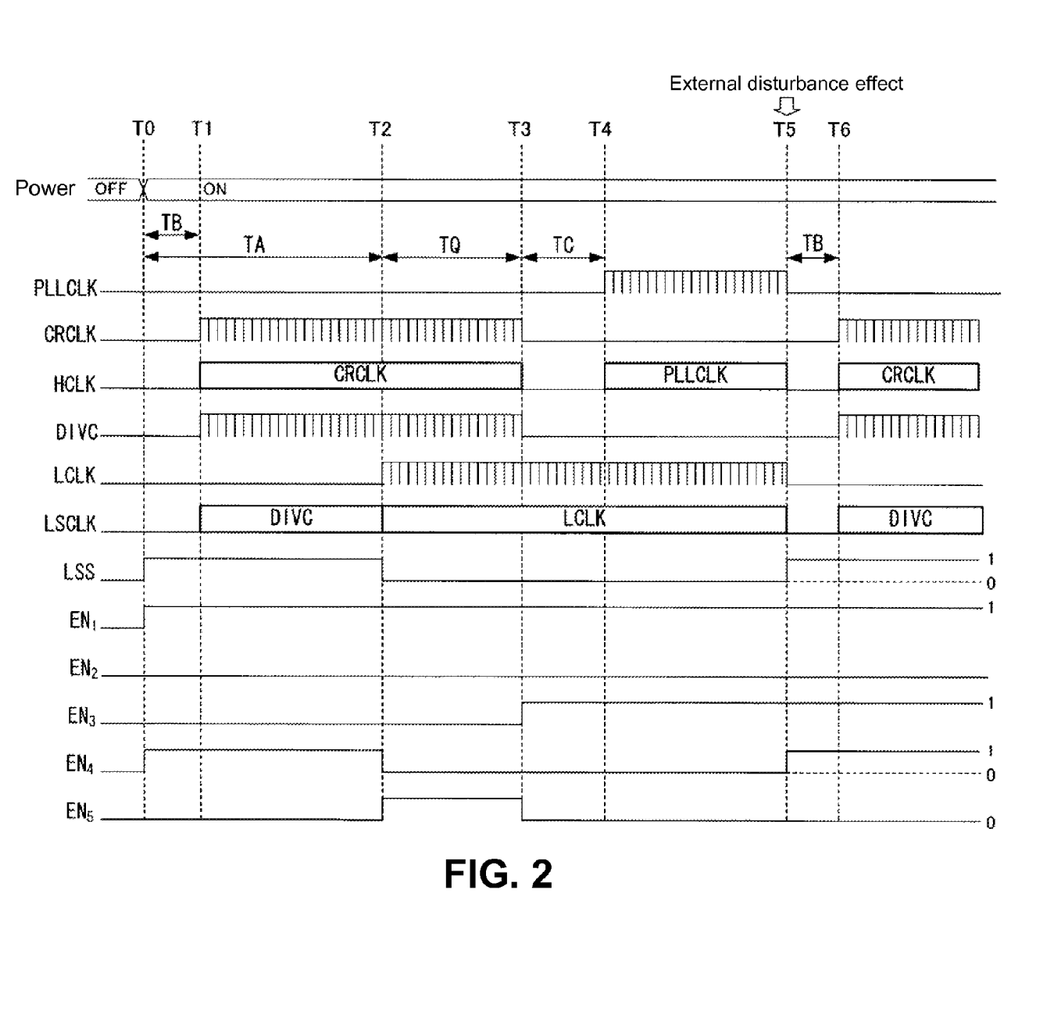
FIG. 2 is a time chart showing an operation of the clock signal generation circuit according to the first embodiment of the present invention.

An operation of the clock signal generation unit 2 shown in FIG. 1 will be explained with reference to FIG. 2. FIG. 2 is a time chart showing the operation of the clock signal generation circuit according to the first embodiment of the present invention.

As shown in FIG. 2, when the power is turned on at a timing T0, the startup control circuit 20 supplies the oscillation enable signal EN1 with the logic level "1" to the low speed crystal oscillation circuit 21, so that the low speed crystal oscillation circuit 21 starts the oscillation operation. Further, the startup control circuit 20 supplies the oscillation enable signal EN1 with the logic level "0" to the high speed crystal oscillation circuit 22 and the high speed PLL oscillation circuit 23, so that the high speed crystal oscillation circuit 22 and the high speed PLL oscillation circuit 23 stop the oscillation operation.

According to the oscillation enable signal EN1 with the logic level "1" supplied at the timing T0, the low speed crystal oscillation circuit 21 starts the oscillation operation. At a timing T2 after the oscillation stabilization period TA (for example, a few hundreds ms), the low speed crystal oscillation circuit 21 becomes the state of transmitting the oscillation clock signal LCLK. Accordingly, during the period between the timing T0 and the timing T2, the low speed crystal oscillation circuit 21 does not generate the oscillation clock signal LCLK.

Accordingly, during the period, the low speed clock control circuit 24 supplies the oscillation enable signal EN4 with the logic level "1" to the high speed CR oscillation circuit 28, so that the high speed CR oscillation circuit 28 starts the oscillation operation. As a result, the high speed CR oscillation circuit 28 starts the oscillation operation. At a timing T1 after the oscillation stabilization period TB (for example, a few tens ms), the high speed CR oscillation circuit 28 becomes the state of transmitting the oscillation clock signal CRCLK. At this moment, the frequency division circuit 29 supplies the frequency division clock signal DIVC obtained through dividing the oscillation clock signal CRCLK by N to the low speed clock selection circuit 26.

Further, in the embodiment, when the power is turned on at the timing T0, the startup control circuit 20 supplies the reset pulse signal RS to the low speed clock control circuit 24 and the high speed clock control circuit 25, respectively. According to the reset pulse signal RS, the high speed clock control circuit 25 supplies the high speed clock selection control signal HCS to the high speed clock selection circuit 27, so that the high speed clock selection circuit 27 selects the oscillation clock signal CRCLK, and the low speed clock control circuit 24 supplies the low speed clock selection control signal LSS with the logic level "1" to the low speed clock selection circuit 26, so that the low speed clock selection circuit 26 selects the frequency division clock signal DIVC.

Accordingly, as shown in FIG. 2, after the timing T1, the oscillation clock signal CRCLK generated with the high speed CR oscillation circuit 28 is supplied to the logic circuit unit 1 as the high speed clock signal HCLK, and the frequency division clock signal DIVC generated with the frequency division circuit 29 is supplied to the logic circuit unit 1 as the low speed clock signal LSCLK.

In the embodiment, at the timing T2 shown in FIG. 2, after the low speed crystal oscillation circuit 21 becomes the state of transmitting the oscillation clock signal LCLK, the low speed clock control circuit 24 changes the state of the low speed clock selection control signal LSS to be supplied to the low speed clock selection circuit 26 to the logic level "0", so that the low speed clock selection circuit 26 selects the oscillation clock signal LCLK. Further, at this moment, the low speed clock control circuit 24 changes the state of the oscillation enable signal EN4 to the logic level "0", so that the high speed CR oscillation circuit 28 stops the oscillation operation. Accordingly, instead of the frequency division clock signal DIVC, the oscillation clock signal LCLK generated with the low speed crystal oscillation circuit 21 is supplied to the logic circuit unit 1 as the low speed clock signal LSCLK.

Further, when the state of the low speed clock selection control signal LSS is switched from the logic level "1" to the logic level "0" at the timing T2, the high speed clock control circuit 25 supplies the oscillation enable signal EN5 with the logic level "1" to the high speed CR oscillation circuit 28, so that the high speed CR oscillation circuit 28 starts the oscillation operation. It is noted that the high speed CR oscillation circuit 28 continues the oscillation operation for generating the oscillation clock signal CRCLK after the timing T2.

After the state of the low speed clock selection control signal LSS is switched from the logic level "1" to the logic level "0" at the timing T2, when a specific period of time TQ is elapsed at a timing T3, the high speed clock control circuit 25 switches the state of the oscillation enable signal EN5 supplied to the high speed CR oscillation circuit 28 from the logic level "1" to the logic level "0", so that the high speed CR oscillation circuit 28 stops the oscillation operation. Accordingly, the high speed CR oscillation circuit 28 stops generating the oscillation clock signal CRCLK, and the frequency division circuit 29 stops generating the frequency division clock signal DIVC.

Further, at the timing T3, the startup control circuit 20 supplies the oscillation enable signal EN3 with the logic level "1" to the high speed PLL oscillation circuit 23, so that the high speed PLL oscillation circuit 23 starts the oscillation operation. Accordingly, the high speed PLL oscillation circuit 23 starts the oscillation operation. At a timing T4 after the oscillation stabilization period TC (for example, a few ms) is elapsed from the timing T3, the high speed PLL oscillation circuit 23 becomes the state of transmitting the oscillation clock signal PLLCLK.

Further, at the timing T3, the high speed clock control circuit 25 supplies the high speed clock selection control signal HCS to the high speed clock selection circuit 27, so that the high speed clock selection circuit 27 selects the oscillation clock signal PLLCLK generated with the high speed PLL oscillation circuit 23. Accordingly, as shown FIG. 2, after the timing T4, the oscillation clock signal PLLCLK generated with the high speed PLL oscillation circuit 23 is supplied to the logic circuit unit 1 as the high speed clock signal HCLK.

In the embodiment, it is supposed that an external noise such as an electromagnetic wave, vibration, and the like, or an external disturbance effect such as moisture, dust, a foreign matter, and the like occurs at a timing T5. Associated with the external noise or the external disturbance effect, when the first crystal oscillator 3 externally connected to the LSI stops the oscillation operation, the low speed crystal oscillation circuit 21 stops the oscillation operation as well. Accordingly, the low speed crystal oscillation circuit 21 stops generating the oscillation clock signal LCLK.

As shown in FIG. 2, at the timing T5, when the low speed clock control circuit 24 detects that the low speed crystal oscillation circuit 21 stops supplying the oscillation clock signal LCLK, the low speed clock control circuit 24 supplies the oscillation enable signal EN4 with the logic level "1", so that the high speed CR oscillation circuit 28 starts the oscillation operation. Accordingly, the high speed CR oscillation circuit 28 starts the oscillation operation.

At a timing T6 after the oscillation stabilization period TB (for example, a few tens ms), the high speed CR oscillation circuit 28 becomes the state of transmitting the oscillation clock signal CRCLK. At this moment, the frequency division circuit 29 divides the oscillation clock signal CRCLK by N to generate the frequency division clock signal DIVC having the frequency equal to or substantially similar to the frequency of the oscillation clock signal LCLK generated with the low speed crystal oscillation circuit 21. Then, the frequency division circuit 29 supplies the frequency division clock signal DIVC to the low speed clock selection circuit 26.

Further, at the timing T5, the low speed clock control circuit 24 supplies the low speed clock selection control signal LSS with the logic level "1" to the low speed clock selection circuit 26 and the high speed clock control circuit 25, so that the low speed clock selection circuit 26 selects the frequency division clock signal DIVC.

Accordingly, in the embodiment, even when the first crystal oscillator 3 stops the oscillation operation, after the timing T6 shown in FIG. 2, the frequency division clock signal DIVC generated with the frequency division circuit 29 is supplied to the logic circuit unit 1 as the low speed clock signal LSCLK. Further, the oscillation clock signal CRCLK generated with the high speed CR oscillation circuit 28 is supplied to the logic circuit unit 1 as the high speed clock signal HCLK.

As described above, in the clock signal generation unit 2 in the embodiment, during the oscillation stabilization period TA from the timing T0 when the power is turned on to the timing T2 when the oscillation operation of the low speed crystal oscillation circuit 21 is stabilized, the oscillation clock signal CRCLK generated with the high speed CR oscillation circuit 28 having the oscillation stabilization period TB that is relatively short is supplied to the logic circuit unit 1 as the high speed clock signal HCLK.

Further, the frequency division circuit 29 is configured to divide the oscillation clock signal CRCLK generated with the high speed CR oscillation circuit 28 by N to generate the frequency division clock signal DIVC having the frequency equal to or substantially similar to the frequency of the oscillation clock signal LCLK generated with the low speed crystal oscillation circuit 21. Then, the frequency division clock signal DIVC is supplied to the logic circuit unit 1 as the low speed clock signal LSCLK.

In other word, after the power is turned on, until the oscillation operation of the low speed crystal oscillation circuit 21 is stabilized, the oscillation clock signal CRCLK, which is generated with the high speed CR oscillation circuit 28 as the high speed clock signal HCLK is divided by N to generate the frequency division clock signal DIVC having the lower frequency. Then, the frequency division clock signal DIVC is supplied to the logic circuit unit 1 as the low speed clock signal LSCLK. Accordingly, in the logic circuit unit 1, it is possible to reduce the startup time of the circuit operated with only the low speed clock signal LSCLK, or both the low speed clock signal LSCLK and the high speed clock signal HCLK.

Further, in the clock signal generation unit 2 in the embodiment, after the timing T2 when the oscillation operation of the low speed crystal oscillation circuit 21 is stabilized, the oscillation clock signal LCLK generated with the low speed crystal oscillation circuit 21 is supplied to the logic circuit unit 1 as the low speed clock signal LSCLK.

Further, in the clock signal generation unit 2 in the embodiment, when the low speed crystal oscillation circuit 21 accidently stops generating the oscillation clock signal LCLK (at the timing T5), the high speed CR oscillation circuit 28 and the frequency division circuit 29 are started one again. Then, the operation is automatically switched (at the timing T6), so that the frequency division clock signal DIVC generated with the frequency division circuit 29 is supplied to the logic circuit unit 1 as the low speed clock signal LSCLK, and the oscillation clock signal CRCLK generated with the high speed CR oscillation circuit 28 is supplied to the logic circuit unit 1 as the high speed clock signal HCLK.

Accordingly, even when the first crystal oscillator 3 externally connected to the LSI for generating the low speed clock signal LSCLK and the second crystal oscillator 4 externally connected to the LSI for generating the high speed clock signal HCLK accidently stop due to the external disturbance, it is possible to continuously supply the low speed clock signal LSCLK and the high speed clock signal HCLK to the logic circuit unit 1.

Second Embodiment

Figure 3:
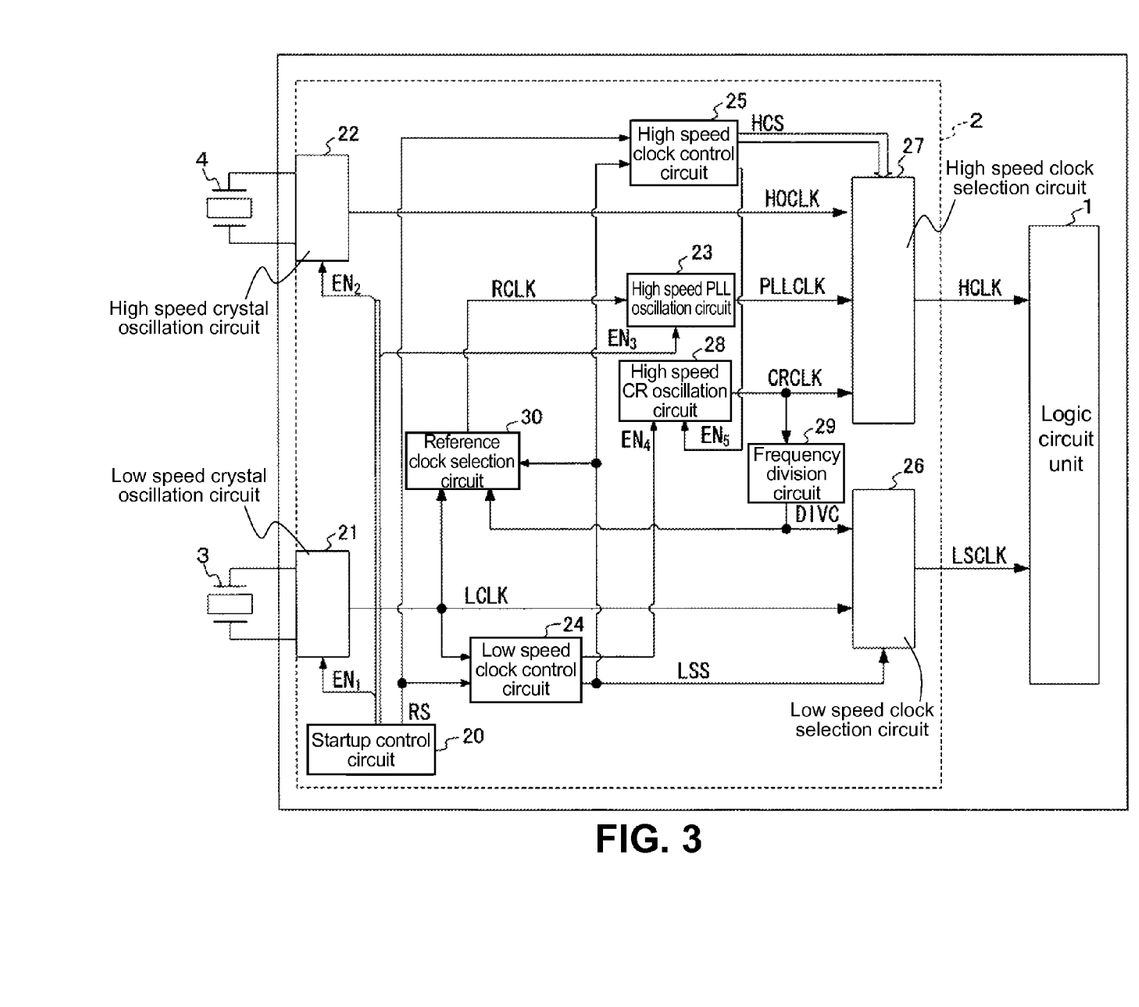
FIG. 3 is a block diagram showing an internal configuration of an LSI with a clock signal generation circuit disposed therein according to a second embodiment of the present invention.

A second embodiment of the present invention will be explained next. FIG. 3 is a block diagram showing an internal configuration of an LSI with a clock signal generation circuit disposed therein according to the second embodiment of the present invention.

As shown in FIG. 3, the clock signal generation unit 2 includes a reference clock selection circuit 30. Other components of the clock signal generation unit 2 are similar to those of the clock signal generation unit 2 shown in FIG. 1. In the following description, an operation of the clock signal generation unit 2, especially an operation of the reference clock selection circuit 30, will be mainly explained.

In the second embodiment, the reference clock selection circuit 30 is configured to select one indicated with the low speed clock selection control signal LSS from the oscillation clock signal LCLK supplied from the low speed crystal oscillation circuit 21 and the frequency division clock signal DIVC supplied from the frequency division circuit 29. Further, the reference clock selection circuit 30 is configured to supply the selected one to the high speed PLL oscillation circuit 23 as a reference oscillation clock signal RCLK.

In the second embodiment, with the reference oscillation clock signal RCLK as the reference clock, the high speed PLL oscillation circuit 23 is configured to generate the oscillation clock signal PLLCLK having a frequency higher than that of the reference oscillation clock signal RCLK and a phase synchronized with that of the reference oscillation clock signal RCLK. Then, the high speed PLL oscillation circuit 23 supplies the oscillation clock signal PLLCLK to the high speed clock selection circuit 27.

Figure 4:
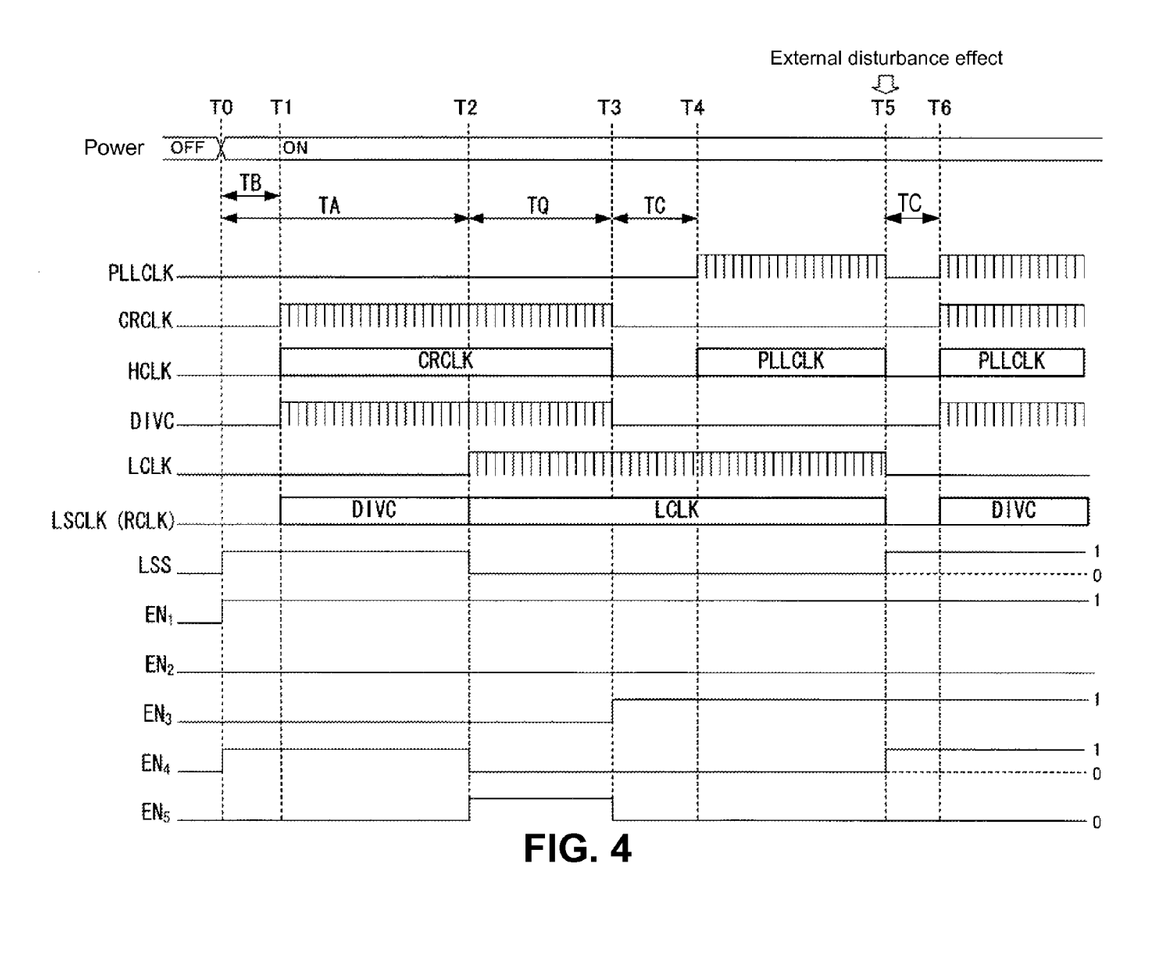
FIG. 4 is a time chart showing an operation of the clock signal generation circuit according to the second embodiment of the present invention.

An operation of the clock signal generation unit 2 shown in FIG. 3 will be explained with reference to FIG. 4. FIG. 4 is a time chart showing the operation of the clock signal generation circuit according to the second embodiment of the present invention.

As shown in FIG. 4, when the power is turned on at the timing T0, the startup control circuit 20 supplies the oscillation enable signal EN1 with the logic level "1" to the low speed crystal oscillation circuit 21 and the high speed PLL oscillation circuit 23, so that the low speed crystal oscillation circuit 21 and the high speed PLL oscillation circuit 23 start the oscillation operation. Further, the startup control circuit 20 supplies the oscillation enable signal EN1 with the logic level "0" to the high speed crystal oscillation circuit 22, so that the high speed crystal oscillation circuit 22 stops the oscillation operation.

According to the oscillation enable signal EN1 with the logic level "1" supplied at the timing T0, the low speed crystal oscillation circuit 21 starts the oscillation operation. At the timing T2 after the oscillation stabilization period TA, the low speed crystal oscillation circuit 21 becomes the state of transmitting the oscillation clock signal LCLK. Accordingly, the period between the timing T0 and the timing T2, the low speed crystal oscillation circuit 21 does not generate the oscillation clock signal LCLK.

Accordingly, during the period, the low speed clock control circuit 24 supplies the oscillation enable signal EN4 with the logic level "1" to the high speed CR oscillation circuit 28, so that the high speed CR oscillation circuit 28 starts the oscillation operation. As a result, the high speed CR oscillation circuit 28 starts the oscillation operation. At the timing T1 after the oscillation stabilization period TB, the high speed CR oscillation circuit 28 becomes the state of transmitting the oscillation clock signal CRCLK. At this moment, the frequency division circuit 29 supplies the frequency division clock signal DIVC obtained through dividing the oscillation clock signal CRCLK by N to the low speed clock selection circuit 26 and the reference clock selection circuit 30.

Further, in the second embodiment, when the power is turned on at the timing T0, the startup control circuit 20 supplies the reset pulse signal RS to the low speed clock control circuit 24 and the high speed clock control circuit 25. According to the reset pulse signal RS, the high speed clock control circuit 25 supplies the high speed clock selection control signal HCS to the high speed clock selection circuit 27, so that the high speed clock selection circuit 27 selects the oscillation clock signal CRCLK, and the low speed clock control circuit 24 supplies the low speed clock selection control signal LSS with the logic level "1" to the low speed clock selection circuit 26, so that the low speed clock selection circuit 26 selects the frequency division clock signal DIVC.

Accordingly, as shown in FIG. 4, after the timing T1, the oscillation clock signal CRCLK generated with the high speed CR oscillation circuit 28 is supplied to the logic circuit unit 1 as the high speed clock signal HCLK, and the frequency division clock signal DIVC generated with the frequency division circuit 29 is supplied to the logic circuit unit 1 as the low speed clock signal LSCLK.

It is noted that, in the second embodiment, the high speed PLL oscillation circuit 23 is not started at this moment as shown in FIG. 4. Alternatively, the high speed PLL oscillation circuit 23 may be started through a software processing, so that the high speed clock selection circuit 27 selects the oscillation clock signal PLLCLK generated with the high speed PLL oscillation circuit 23.

In the second embodiment, it is supposed that an external noise such as an electromagnetic wave, vibration, and the like, or an external disturbance effect such as moisture, dust, a foreign matter, and the like occurs at the timing T5. Associated with the external noise or the external disturbance effect, when the first crystal oscillator 3 externally connected to the LSI stops the oscillation operation, the low speed crystal oscillation circuit 21 stops the oscillation operation as well. Accordingly, the low speed crystal oscillation circuit 21 stops generating the oscillation clock signal LCLK.

As shown in FIG. 4, at the timing T5, when the low speed clock control circuit 24 detects that the low speed crystal oscillation circuit 21 stops supplying the oscillation clock signal LCLK, the low speed clock control circuit 24 supplies the oscillation enable signal EN4 with the logic level "1", so that the high speed CR oscillation circuit 28 starts the oscillation operation. Accordingly, the high speed CR oscillation circuit 28 starts the oscillation operation. At the timing T6 after the oscillation stabilization period TB, the high speed CR oscillation circuit 28 becomes the state of transmitting the oscillation clock signal CRCLK. At this moment, the frequency division circuit 29 divides the oscillation clock signal CRCLK by N to generate the frequency division clock signal DIVC having the frequency equal to or substantially similar to the frequency of the oscillation clock signal LCLK generated with the low speed crystal oscillation circuit 21. Then, the frequency division circuit 29 supplies the frequency division clock signal DIVC to the low speed clock selection circuit 26.

Further, at the timing T5, the low speed clock control circuit 24 supplies the low speed clock selection control signal LSS with the logic level "1" to the low speed clock selection circuit 26 and the reference clock selection circuit 30, so that the low speed clock selection circuit 26 selects the frequency division clock signal DIVC. Accordingly, the high speed PLL oscillation circuit 23 starts the oscillation operation with the frequency division clock signal DIVC as the reference clock. At the timing T6 after the oscillation stabilization period TC, the high speed PLL oscillation circuit 23 becomes the state of transmitting the oscillation clock signal PLLCLK.

Accordingly, in the second embodiment, even when the first crystal oscillator 3 or the second crystal oscillator 4 stops the oscillation operation due to the external disturbance effect and the like, after the timing T6 shown in FIG. 2, the frequency division clock signal DIVC generated with the frequency division circuit 29 is supplied to the logic circuit unit 1 as the low speed clock signal LSCLK. Further, the oscillation clock signal PLLCLK generated with the high speed PLL oscillation circuit 23 is supplied to the logic circuit unit 1 as the high speed clock signal HCLK.

In the second embodiment, the high speed clock selection circuit 27 is configured to select the oscillation clock signal PLLCLK, the oscillation clock signal CRCLK, the frequency division clock signal DIVC, and the oscillation clock signal LCLK depending on whether the low speed crystal oscillation circuit 21 supplies the oscillation clock signal LCLK or not. Alternatively, the low speed clock control circuit 24 and the high speed clock selection circuit 27 may be configured to select the oscillation clock signal PLLCLK, the oscillation clock signal CRCLK, the frequency division clock signal DIVC, and the oscillation clock signal LCLK depending on whether the high speed crystal oscillation circuit 22 supplies the oscillation clock signal HOCLK or not.

Further, in the second embodiment, the low speed clock control circuit 24 is configured to detect that the low speed crystal oscillation circuit 21 stops generating the oscillation clock signal LCLK, and select the low speed clock signal LSCLK. Alternatively, software may be executed detect that the low speed crystal oscillation circuit 21 stops generating the oscillation clock signal LCLK, and select the low speed clock signal LSCLK.

In the first embodiment and the second embodiment, the operation of the clock signal generation unit 2 is explained with reference to FIGS. 2 and 4 immediately after the power is turned on as an example. The operation of the clock signal generation unit 2 may be performed when an entire portion or a part of the logic circuit unit 1 is stopped and returned to the normal operation in the state that the power is turned on.

In the first embodiment and the second embodiment, the LSI shown in FIGS. 1 and 3 includes the first crystal oscillator 3 and the second crystal oscillator 4 disposed externally as the crystal oscillator. Alternatively, the LSI shown in FIGS. 1 and 3 may include a ceramic oscillator. In this case, instead of the low speed crystal oscillation circuit 21, a low speed ceramic oscillation circuit is provided, and instead of the high speed crystal oscillation circuit 22, a high speed ceramic oscillation circuit is provided The disclosure of Japanese Patent Application No. 2011-074838, filed on Mar. 30, 2011, is incorporated in the application by reference.

While the invention has been explained with reference to the specific embodiments of the invention, the explanation is illustrative and the invention is limited only by the appended claims.

What is claimed is:

1. A clock signal generation circuit for generating a high speed clock signal having a first frequency and a low speed clock signal having a second frequency lower than the first frequency, comprising:
   a first oscillation circuit for generating a first oscillation clock signal having the first frequency;
   a second oscillation circuit for generating a second oscillation clock signal having the second frequency;
   a frequency division circuit for generating a frequency division clock signal obtained through dividing the first oscillation clock signal; and
   a clock selection circuit for outputting the first oscillation clock signal as the high speed clock signal,
   wherein said clock selection circuit is configured to output the second oscillation clock signal as the low speed clock signal when the second oscillation circuit transmits the second oscillation clock signal, and
   said clock selection circuit is configured to output the frequency division clock signal as the low speed clock signal when the second oscillation circuit does not transmit the second oscillation clock signal.

2. The clock signal generation circuit according to claim 1, further comprising a third oscillation circuit for generating a third oscillation clock signal having the first frequency and a phase synchronized with that of the second oscillation clock signal, said clock selection circuit being configured to output the first oscillation clock signal as the high speed clock signal before a specific period of time is elapsed after power is turned on, said clock selection circuit being configured to output the third oscillation clock signal as the high speed clock signal after the specific period of time is elapsed and the power is turned on.

3. The clock signal generation circuit according to claim 2, wherein said first oscillation circuit is formed of a CR (Capacitor Resistor) oscillation circuit including a capacitor and a resistor, said second oscillation circuit is formed of a ceramic oscillation circuit, and said third oscillation circuit is formed of a PLL (Phase Locked Loop) oscillation circuit.

4. The clock signal generation circuit according to claim 2, wherein said clock selection circuit is configured to output the first oscillation clock signal as the high speed clock signal before the specific period of time is elapsed after the power is turned on, said specific period of time being from when the second oscillation circuit starts transmitting the second oscillation clock signal to when the third oscillation circuit starts transmitting the third oscillation clock signal according to the second oscillation clock signal.

5. The clock signal generation circuit according to claim 2, wherein said third oscillation circuit is configured to generate the third oscillation clock signal having the first frequency and the phase synchronized with that of the second oscillation clock signal when the second oscillation circuit transmits the second oscillation clock signal.

6. The clock signal generation circuit according to claim 2, wherein said third oscillation circuit is configured to generate the third oscillation clock signal having the first frequency and a phase synchronized with that of the frequency division clock signal when the second oscillation circuit does not transmit the second oscillation clock signal.

* * * * *